(12) United States Patent
Birgiolas et al.

(10) Patent No.: US 11,336,516 B1
(45) Date of Patent: May 17, 2022

(54) CONFIGURING AND DISPLAYING A PROGRESS INDICATOR IN A VIRTUAL PRIVATE NETWORK

(71) Applicant: Netflow, UAB, Vilnius (LT)

(72) Inventors: Eligijus Birgiolas, Vilnius (LT); Karolis Kaciulis, Kaišiadorys (LT)

(73) Assignee: Netflow, UAB, Vilnius (LT)

( * ) Notice: Subject to any disclaimer, the term of this patent is extended or adjusted under 35 U.S.C. 154(b) by 0 days.

(21) Appl. No.: 17/486,846

(22) Filed: Sep. 27, 2021

(51) Int. Cl.
*H04L 41/0806* (2022.01)
*H04L 29/06* (2006.01)
*H04L 41/0823* (2022.01)

(52) U.S. Cl.
CPC ...... *H04L 41/0806* (2013.01); *H04L 41/0823* (2013.01); *H04L 63/0272* (2013.01)

(58) Field of Classification Search
CPC ............. H04L 41/0806; H04L 41/0823; H04L 63/0272
See application file for complete search history.

(56) References Cited

U.S. PATENT DOCUMENTS

| | | | | |
|---|---|---|---|---|
| 9,712,492 B1* | 7/2017 | Kim | .................... | H04L 63/0272 |
| 9,813,379 B1* | 11/2017 | Shevade | ............. | H04L 41/5051 |
| 10,038,672 B1* | 7/2018 | Raviv | ................. | H04L 63/0272 |
| 10,440,058 B2* | 10/2019 | Chen | ........................ | H04L 41/22 |
| 11,184,328 B1* | 11/2021 | Hyder | .................... | H04L 67/16 |
| 2011/0078784 A1* | 3/2011 | Ohtani | ................ | H04L 63/0272 726/15 |
| 2014/0207946 A1* | 7/2014 | Bakthavathsalu | .. | H04L 63/0272 709/224 |
| 2014/0280797 A1* | 9/2014 | Tiger | .................. | H04L 41/0886 709/220 |
| 2016/0134590 A1* | 5/2016 | Chan | ........................ | H04L 41/12 726/15 |
| 2017/0099159 A1* | 4/2017 | Abraham | ................ | H04L 43/08 |
| 2017/0180461 A1* | 6/2017 | Paxinos | .................. | H04L 67/14 |
| 2017/0272554 A1* | 9/2017 | Kwan | ..................... | H04L 43/18 |
| 2019/0132291 A1* | 5/2019 | Zhao | ................... | G06F 9/45558 |
| 2019/0327312 A1* | 10/2019 | Gupta | ..................... | H04L 63/02 |
| 2021/0320871 A1* | 10/2021 | Savarese | ................ | H04L 47/20 |
| 2021/0328832 A1* | 10/2021 | Norbutas | ............ | H04L 12/2807 |

* cited by examiner

*Primary Examiner* — Blake J Rubin
(74) *Attorney, Agent, or Firm* — The Pattani Law Group

(57) ABSTRACT

A method in a virtual private network (VPN) service environment, the method including receiving, from a user device, device information indicating parameters associated with the user device during an established VPN connection, determining, based at least in part on the device information, a VPN server for providing one or more VPN services to the user device during the established VPN connection, determining, based at least in part on the device information and server information associated with the VPN server, respective durations of time associated with performing each of a plurality of processes related to configuring the VPN connection, configuring a progress indicator configured to indicate an amount of time remaining to configure the VPN connection, and transmitting, to the user device, information associated with the progress indicator to enable display of the progress indicator on a screen associated with the user device. Various other aspects are contemplated.

18 Claims, 7 Drawing Sheets

CONFIGURING AND DISPLAYING A PROGRESS INDICATOR IN A VIRTUAL PRIVATE NETWORK

FIELD OF DISCLOSURE

Aspects of the present disclosure generally relate to a virtual private network (VPN), and more particularly to configuring and displaying a progress indicator in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method in a virtual private network (VPN) service environment, the method including receiving, from a user device, device information indicating parameters to be utilized by the user device during an established VPN connection, determining, based at least in part on the device information, a VPN server for providing one or more VPN services to the user device during the established VPN connection, determining, based at least in part on the device information and server information associated with the VPN server, respective durations of time associated with performing each of a plurality of processes related to configuring the VPN connection, configuring a progress indicator configured to indicate an amount of time remaining to configure the VPN connection, and transmitting, to the user device, information associated with the progress indicator to enable display of the progress indicator on a screen associated with the user device.

In another aspect, the present disclosure contemplates a device associated with a VPN, the device comprising a memory and a processor communicatively coupled to the memory, the processor being configured to: receive, from a user device, device information indicating parameters to be utilized by the user device during an established VPN connection; determine, based at least in part on the device information, a VPN server for providing one or more VPN services to the user device during the established VPN connection; determine, based at least in part on the device information and server information associated with the VPN server, respective durations of time associated with performing each of a plurality of processes related to configuring the VPN connection; configure a progress indicator to indicate an amount of remaining time associated with configuring the VPN connection; and transmit, to the user device, information associated with the progress indicator to enable display of the progress indicator on a screen associated with the user device.

In another aspect, the present disclosure contemplates a non-transitory computer readable medium storing instructions, which when executed by a processor cause the processor to: receive, from a user device, device information indicating parameters to be utilized by the user device during an established VPN connection; determine, based at least in part on the device information, a VPN server for providing one or more VPN services to the user device during the established VPN connection; determine, based at least in part on the device information and server information associated with the VPN server, respective durations of time associated with performing each of a plurality of processes related to configuring the VPN connection; configure a progress indicator to indicate an amount of remaining time associated with configuring the VPN connection; and transmit, to the user device, information associated with the progress indicator to enable display of the progress indicator on a screen associated with the user device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
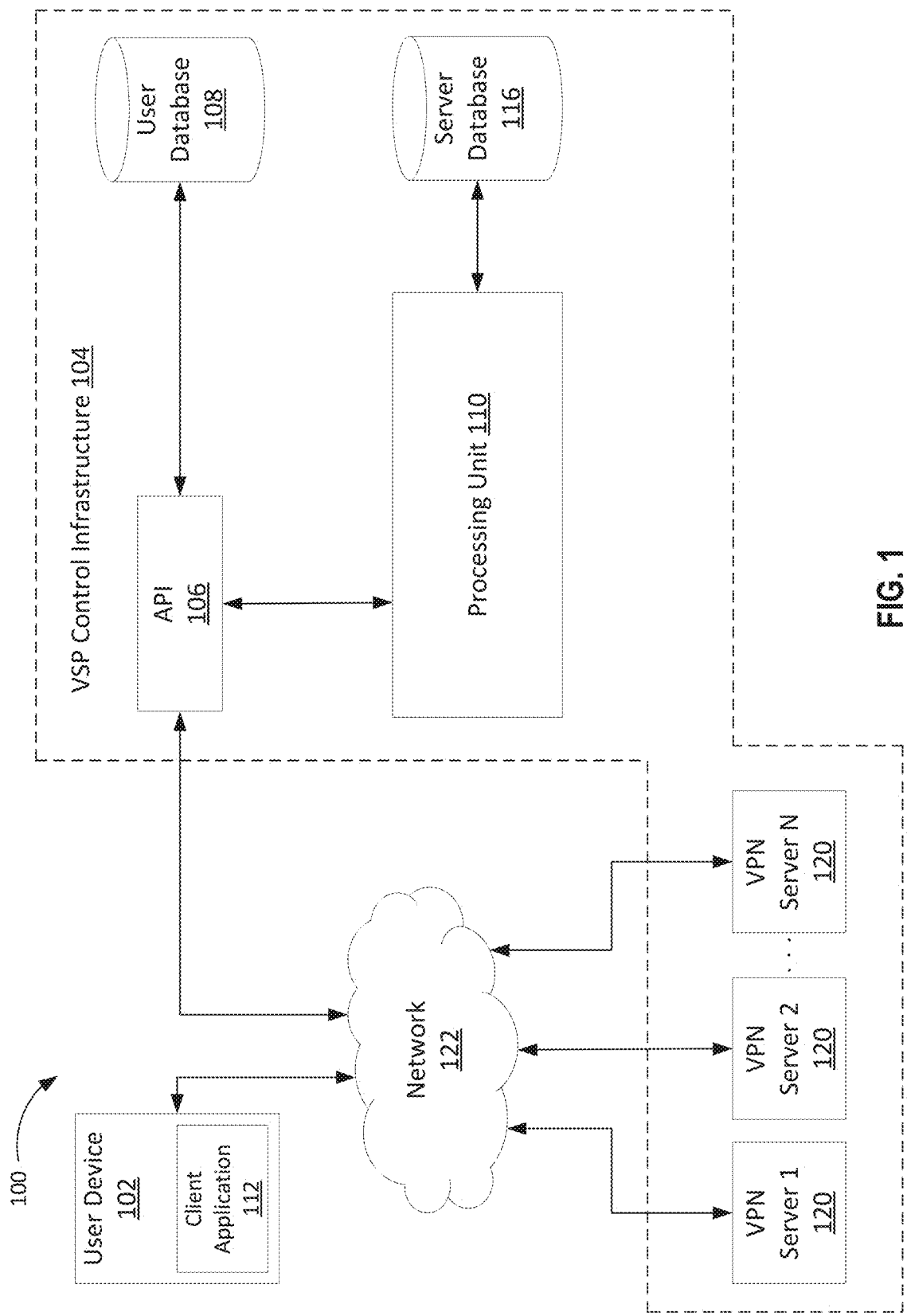

FIG. 1 is an illustration of an example system associated with configuring and displaying a progress indicator in a VPN, according to various aspects of the present disclosure.

Figure 2:
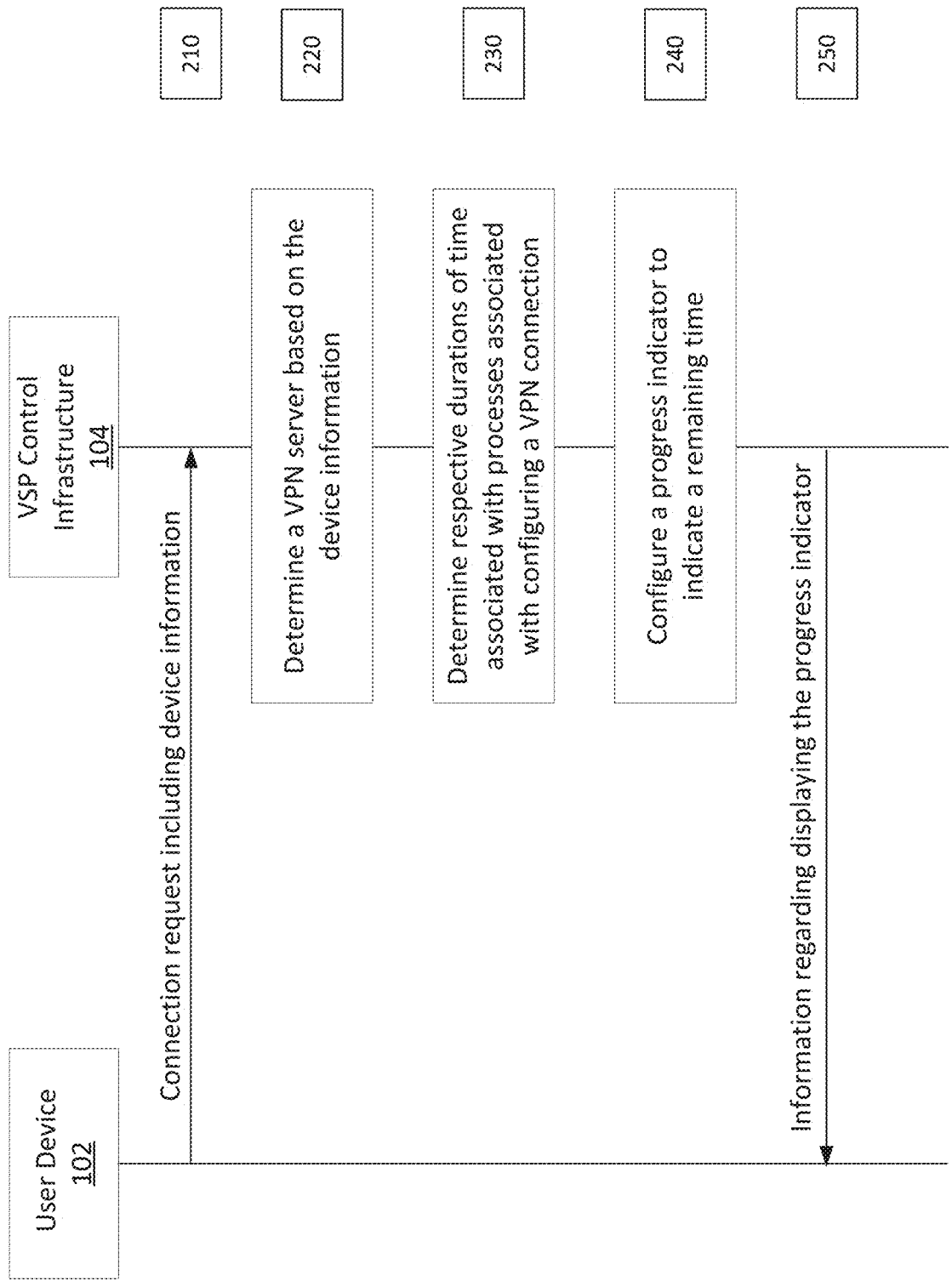

FIG. 2 is an illustration of an example flow associated with configuring and displaying a progress indicator in a VPN, according to various aspects of the present disclosure.

Figure 3:
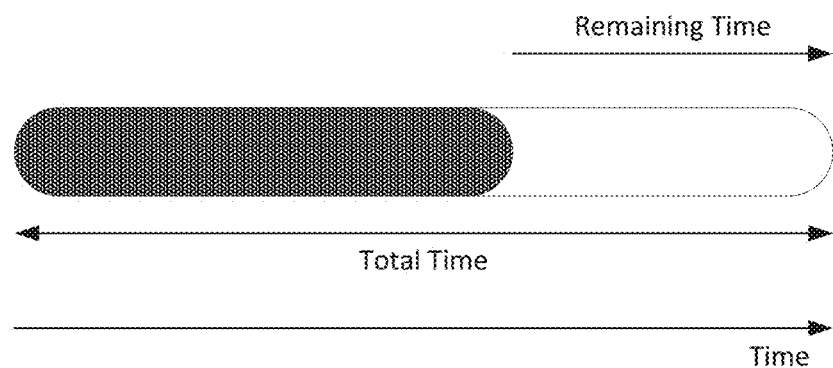
Figure 3:
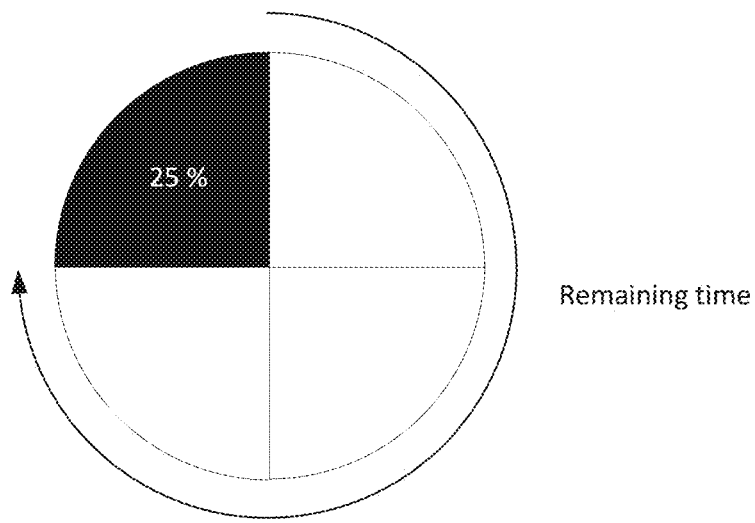
Figure 3:
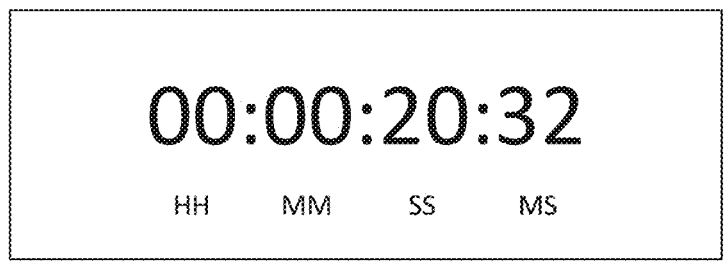

FIG. 3 is an illustration of examples associated with configuring and displaying a progress indicator in a VPN, according to various aspects of the present disclosure.

Figure 4:
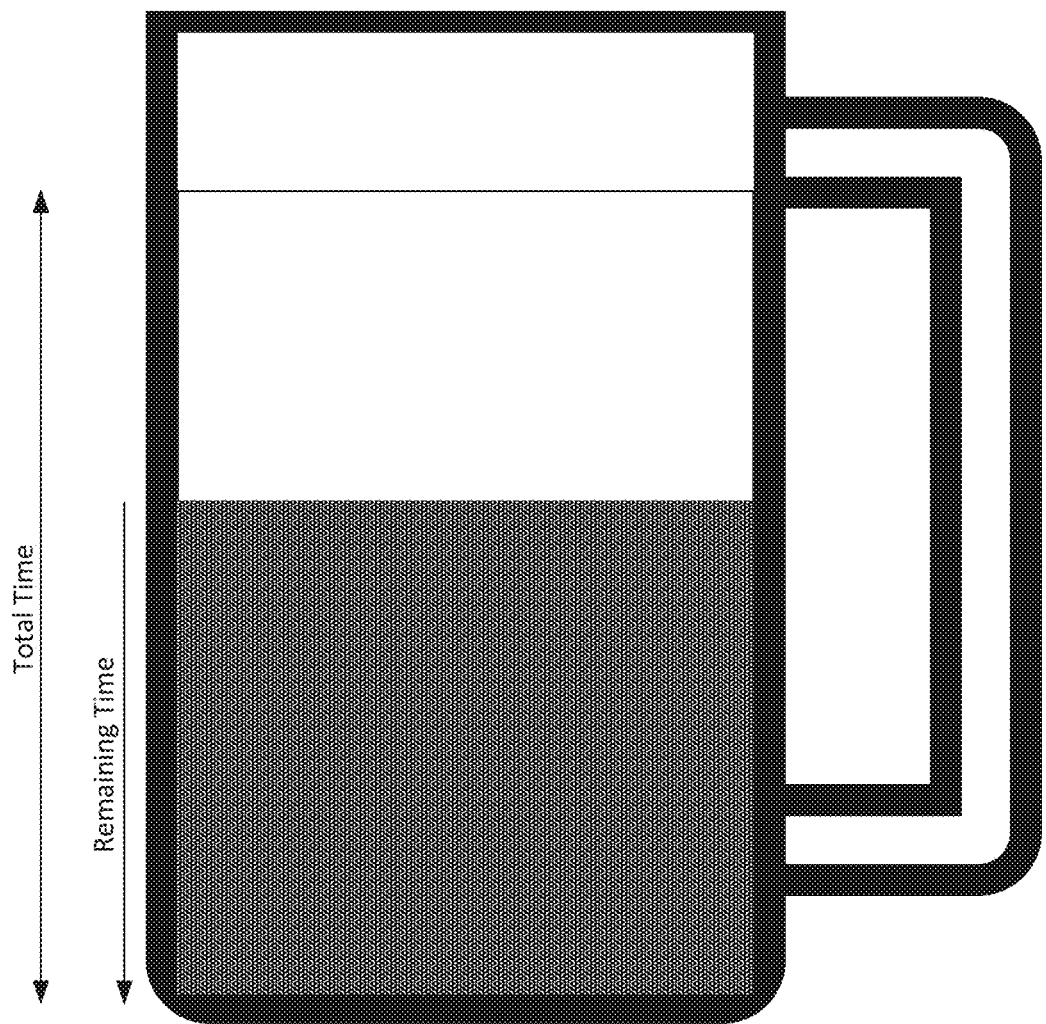

FIG. 4 is an illustration of an example associated with configuring and displaying a progress indicator in a VPN, according to various aspects of the present disclosure.

Figure 5:
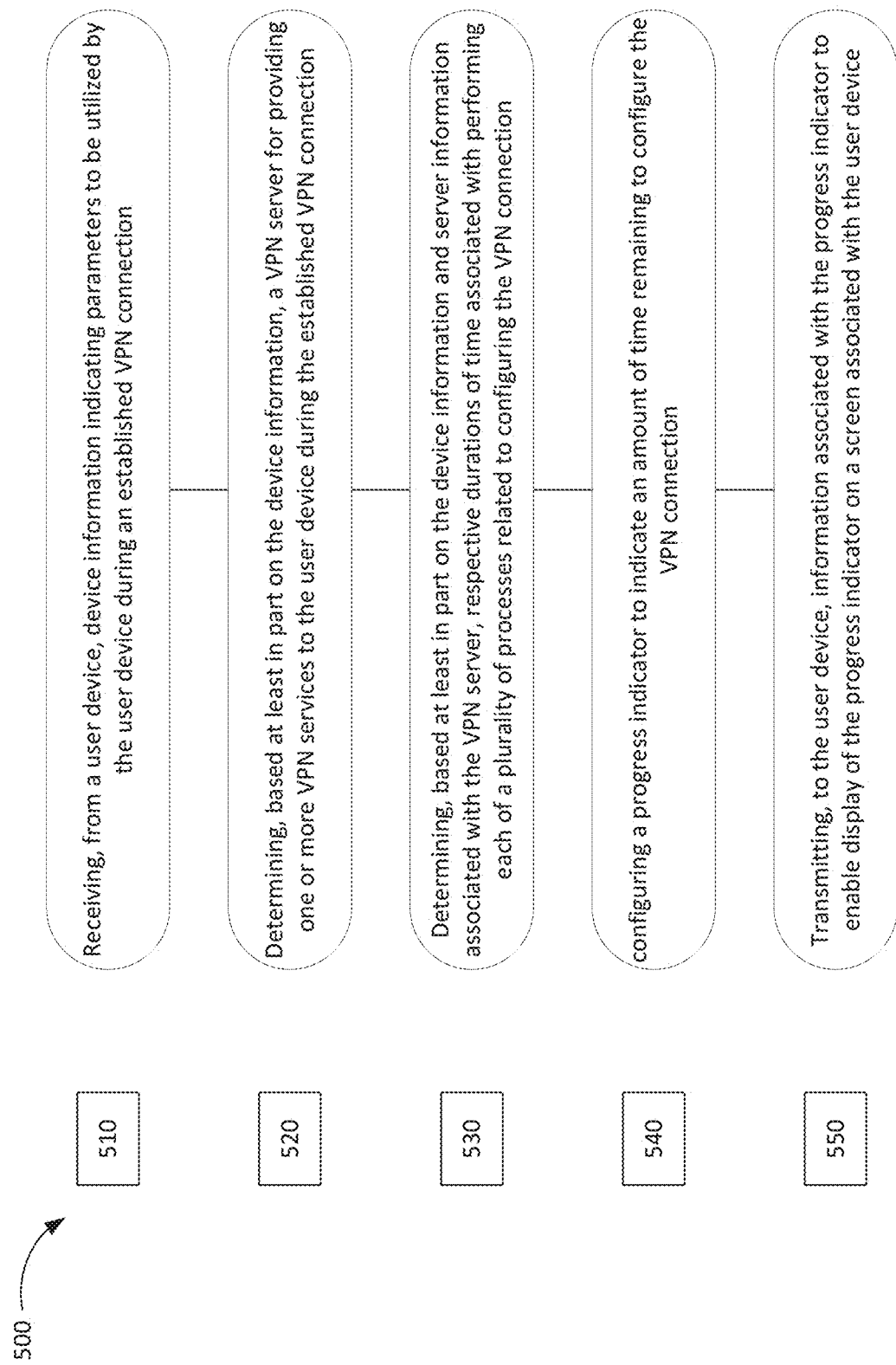

FIG. 5 is an illustration of an example process associated with configuring and displaying a progress indicator in a VPN, according to various aspects of the present disclosure.

Figure 6:
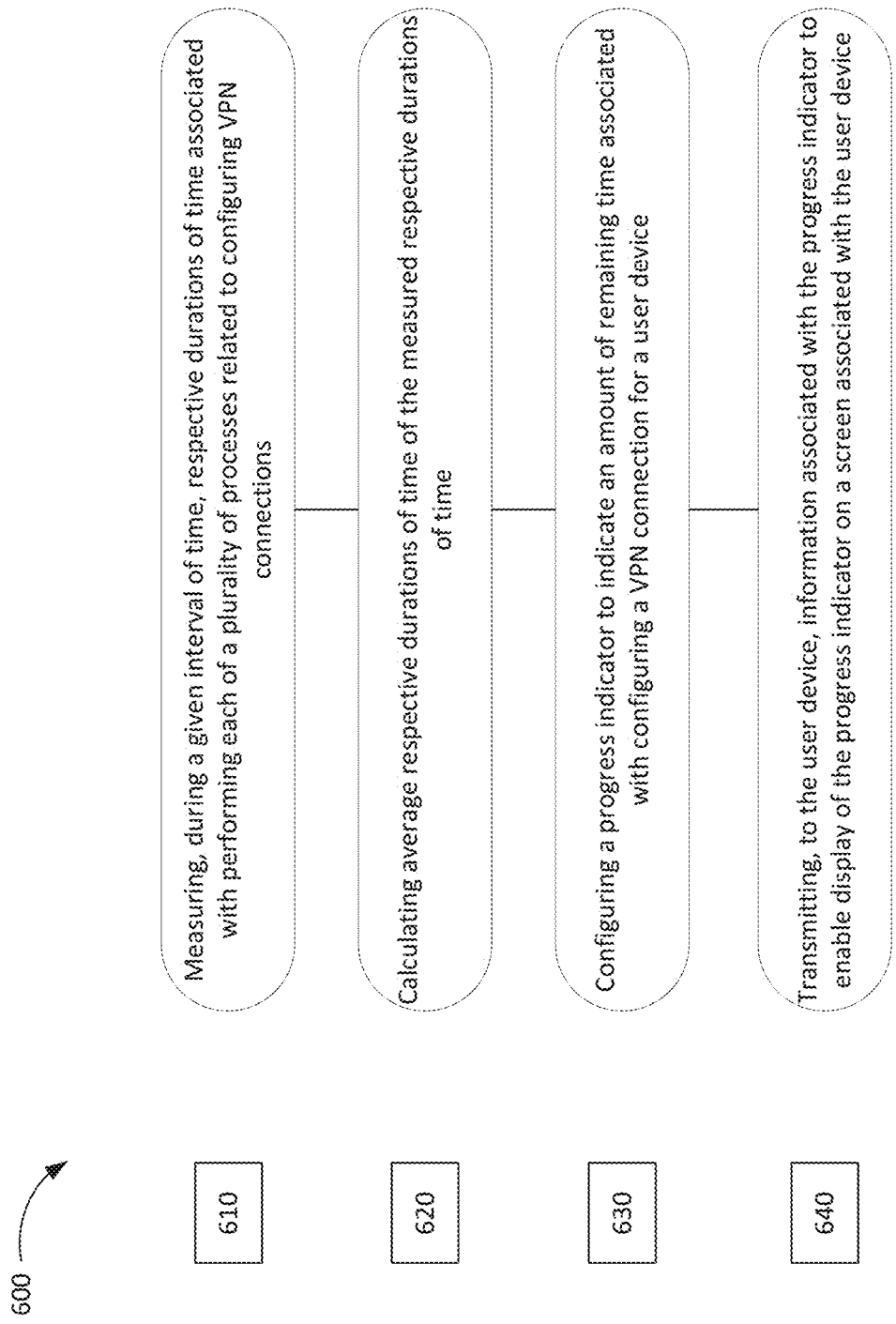

FIG. 6 is an illustration of an example process associated with configuring and displaying a progress indicator in a VPN, according to various aspects of the present disclosure.

Figure 7:
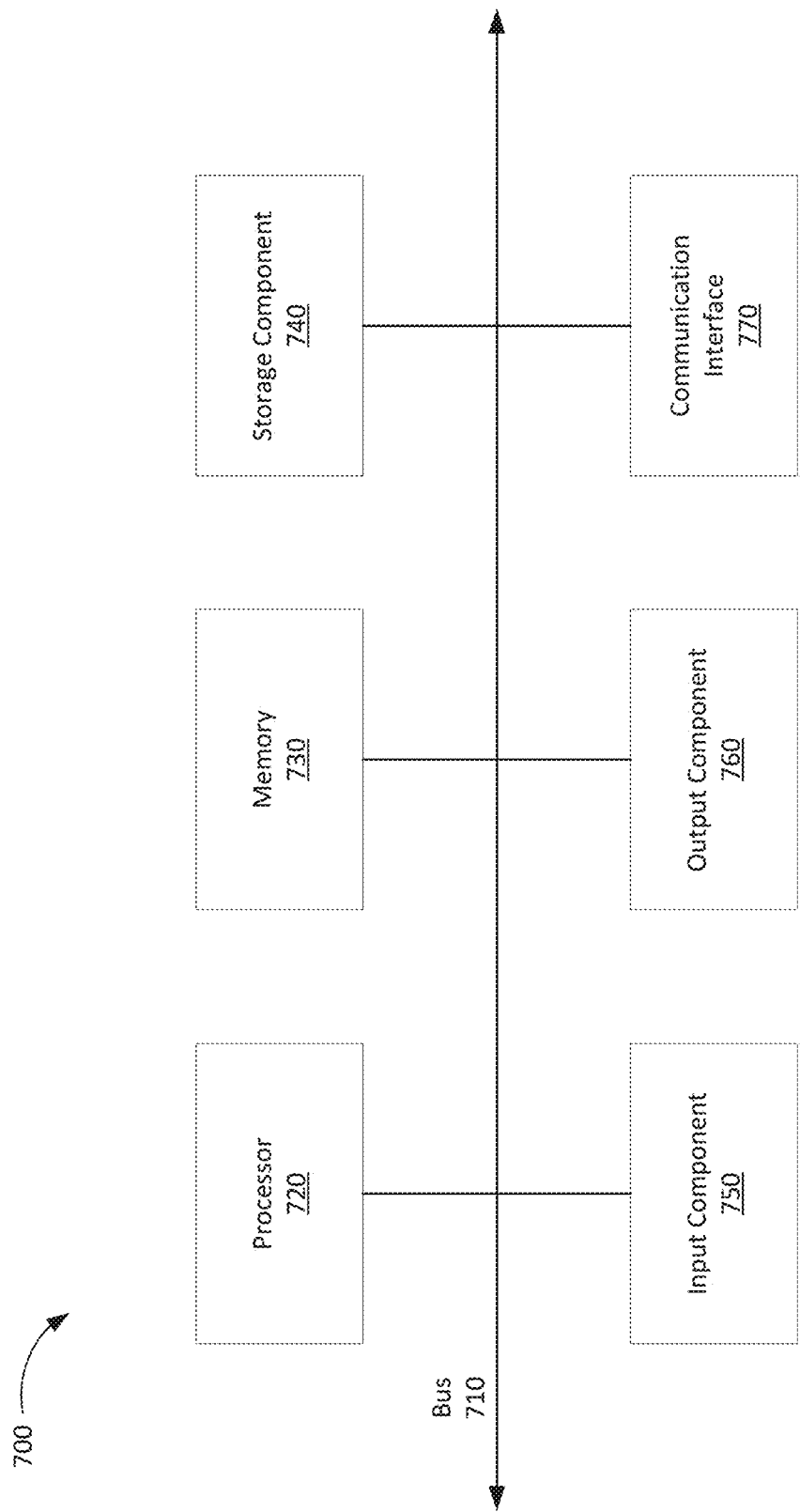

FIG. 7 is an illustration of example devices associated with configuring and displaying a progress indicator in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with configuring and displaying a progress indicator in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, a communication interface, or a combination thereof (e.g., FIG. 5). For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit, via a client application installed on the user device, a connection request and/or an authentication request to an API associated with the VSP control infrastructure. Thereafter, the user device may undergo an authentication process involving the API and a database associated with the VSP control infrastructure. Once authenticated, the VSP control infrastructure may determine a VPN server for providing the VPN services to the user device. The user device may utilize the client application to transmit an initiation request for establishing a VPN connection with the VPN server. Based at least in part on transmitting and/or receiving the initiation request, the client application and/or the VPN server may configure a VPN connection to be established between the user device and the VPN server.

Configuring the VPN connection may include the client application and/or the VPN server performing a plurality of processes such as, for example, setting up a two-way channel between the user device and the VPN server, exchanging protocol information regarding a protocol to be utilized to securely communicate data during the established VPN connection, setting up the protocol based at least in part on the protocol information, exchanging key information associated with keys to be utilized to encrypt and/or decrypt data during the established VPN connection, setting up a secure tunnel by the client application, setting up the secure tunnel by the VPN server, verifying the secure tunnel set up by the client application, etc. The client application and/or the VPN server may spend a certain duration of time to perform each of the plurality of processes. During this time (when the client application and/or the VPN server are performing the plurality of processes), the client application may be configured to display a progress indicator indicating a progress associated with performing the plurality of processes. For instance, the progress indicator may indicate a remaining time (e.g., time remaining to complete performing one or more of the plurality of processes and/or time remaining to configure the VPN connection).

The progress indicator may fail to adequately represent the remaining time. In an example, the progress indicator may be configured to inaccurately indicate that each of the plurality of processes takes an equal amount of time to complete. For instance, the progress indicator may be configured to inaccurately indicate that setting up the two-way channel and setting up the protocol may take an equal amount of time to complete. In another example, the represented remaining time may be based simply on inaccurate estimates. In yet another example, the progress indicator may fail to account for variations associated with completing one or more of the plurality of processes. For instance, the progress indicator may fail to account for variations in a complexity associated with setting up a protocol and may inaccurately indicate that setting up the more complex OpenVPN protocol may take a same amount of time as setting up the less complex Wireguard protocol. As a result, the progress indicator may inaccurately indicate a shorter duration of the remaining time when completing performing the one or more of the plurality of processes and/or configuring the VPN connection may take a longer duration of time. Also, the progress indicator may inaccurately indicate a longer duration of the remaining time when completing performing the one or more of the plurality of processes and/or configuring the VPN connection may take a shorter duration of time.

Additionally, various methods of visually or textually representing the remaining time may include a certain number of predetermined progression steps (e.g., 10%, 20%, etc.). However, the predetermined progression steps may fail to correspond to a number of processes or steps that need to be completed before, for example, the user is authenticated or the VPN connection is established. This may result in the visual representation not being smooth in moving over time where many visual points are progressing at a single time once one process is completed. As a result, such methods fail to provide a reliable way to determine when the process will be finished. Conversely, if the number of visual steps is taken to be equivalent to the number of steps needed to complete the processes, the visual steps may depend on the completion time of the processes but the time it takes to complete each process is not equal, thus the visual steps and process steps may not align.

Failure to adequately represent the remaining time may result in the user device ending the configuration of the VPN connection prior to completion of the performance of the plurality of processes and/or configuring the VPN connection by the client application and/or the VPN server. The user device may retransmit the initiation request and the VPN server may configure a new VPN connection to be established between the user device and the VPN server. Such ending the configuration of the VPN connection, retransmitting the initiation request, and/or configuring a new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Additionally, a delay may be introduced in providing the VPN services to the user device.

Various aspects of systems and techniques discussed in the present disclosure enable configuring and displaying a progress indicator in a VPN. In some aspects, a VSP control infrastructure may configure the progress indicator to be displayed while configuring a VPN connection to be established between a user device and a VPN server. To configure the progress indicator, the VSP control infrastructure may determine respective durations of time associated with performing each of a plurality of processes related to configuring the VPN connection. For instance, the VSP control infrastructure may determine the respective durations of time associated with each of setting up a two-way channel between the user device and the VPN server, exchanging protocol information regarding a protocol to be utilized to securely communicate data during the established VPN connection, setting up the protocol based at least in part on the protocol information, exchanging key information associated with keys to be utilized to encrypt and/or decrypt data during the established VPN connection, setting up a secure tunnel by the client application, setting up the secure tunnel by the VPN server, verifying the secure tunnel set up by the client application, etc. While determining the respective durations of time, the VSP control infrastructure may account for, among other things, differences associated with performing each of the plurality of processes, variations associated with completing one or more of the plurality of processes, etc. Based at least in part on determining the respective durations of time, the VSP control infrastructure may configure the progress indicator to adequately represent a remaining time (e.g., time remaining to complete performing one or more of the plurality of processes and/or time remaining to configure the VPN connection). In this way, the VSP control infrastructure may avoid a situation in which the user device ends the configuration of the VPN connection prior to completion of the performance of the plurality of processes. As a result, retransmitting an initiation request and/or configuring a new VPN connection may be avoided. Consequently, user device resources (e.g., processing resources, memory resources, power consumption resources, battery life, or the like) and resources associated with the VPN (computational resources, network bandwidth, management resources, processing resources, memory resources, or the like) may be used to perform suitable tasks associated with the VPN. Further, one or more VPN services may be provided to the user device without delay.

In some aspects, a processor (e.g., processing unit 110, processor 520, etc.) associated with the VSP control infrastructure may receive, from a user device, device information indicating parameters to be utilized by the user device during an established VPN connection; determine, based at least in part on the device information, a VPN server for providing one or more VPN services to the user device during the established VPN connection; determine, based at least in part on the device information and server information associated with the VPN server, respective durations of time associated with performing each of a plurality of processes related to configuring the VPN connection; configure a progress indicator configured to indicate an amount of time remaining to configure the VPN connection; and cause to display the progress indicator on a screen associated with the user device.

FIG. 2 is an illustration of an example flow associated with configuring and displaying a progress indicator in a VPN, according to various aspects of the present disclosure. FIG. 2 shows a user device 102 in communication with a VSP control infrastructure 104. In some aspects, the user device 102 and the VSP control infrastructure 104 may communicate over a network (e.g., network 122). In some aspects, the user device 102 may utilize an installed client application 112 to communicate with an API (e.g., API 106) associated with the VSP control infrastructure 104.

As shown by reference numeral 210, the user device 102 may transmit a connection request to the VSP control infrastructure 104 for purposes of establishing a VPN connection with a VPN server 120 associated with the VSP control infrastructure 104 and receiving a VPN service. The connection request may include a request for information (e.g., entry IP address) associated with the VPN server 120. In some aspects, the connection request may include device information associated with operation of the user device 102 during the established VPN connection. In some aspects, the user device 102 may transmit the device information in a separate communication at substantially the same time as the connection request.

In some aspects, the VSP control infrastructure 104 may provide the client application 112 to be installed on the user device 102. The client application 112 may enable the user device 102 to receive device information and to transmit the connection request and the device information to the VSP control infrastructure 104. The client application 112 may include a graphical interface to receive device information via a local input interface (e.g., touch screen, keyboard, mouse, pointer, etc.) associated with the user device 102. The device information may be received via text input or via a selection from among a plurality of options (e.g., pull down menu, etc.). In some aspects, the client application 112 may activate and/or enable, at a time associated with transmitting the connection request, the graphical interface for receiving the device information. For instance, the client application 112 may cause a screen (e.g., local screen) associated with the user device 102 to display, for example, a pop-up message to request entry of the device information before or at a time of transmitting the connection request. Further, the client application 112 may enable transmission of the device information to the VSP control infrastructure 104 in association with the connection request. In one example, the client application 112 may enable the device information to be included within the connection request or may enable transmission of the device information in a separate communicate at substantially the same time as transmission of the connection request. In this way, the client application 112 may enable the VSP control infrastructure 104 to receive device information prior to establishment of the VPN connection so that the VSP control infrastructure 104 may configure a progress timer to adequately indicate a remaining time. The VSP control infrastructure 104 may receive the device information in the connection request or via the separate communication.

The device information may indicate one or more parameters associated with the user device 102. For instance, the device information may indicate parameters to be utilized by the user device during the established VPN connection. In an example, the parameters may indicate an Internet protocol (IP) address associated with the user device 102, a VPN protocol to be utilized by the user device 102 and the VPN server 120 during the established VPN connection, an operating system associated with the user device 102, a type of network connection to be used by the user device 102, etc.

As shown by reference numeral 220, the VSP control infrastructure 104 may determine a VPN server 120, from among a plurality of VPN servers 120 associated with the VSP control infrastructure 104, for establishing the VPN connection with the user device 102 and providing one or more VPN services to the user device 102. In an example, the VSP control infrastructure 104 may determine the VPN server 120 based at least in part on the IP address associated with the user device 102. For instance, the VSP control infrastructure 104 may determine a geolocation of the user device 102 based at least in part on the IP address associated with the user device 102. Further, the VSP control infrastructure 104 may determine a VPN server 120 that is located geographically closer to the user device 102 as the VPN server 120 for establishing the VPN connection. In some aspects, the VPN server 120 that is located geographically closer to the user device 102 may be more suitable for providing the VPN services to the user device 102 because the smaller the distance of the VPN server 120 from the user device 102, the less distance the IP packets have to travel over the network, thereby facilitating higher network speed.

As shown by reference numeral 230, the VSP control infrastructure 104 may determine respective durations of time associated with performing each of a plurality of processes related to configuring the VPN connection. In an example, the VSP control infrastructure may determine the respective durations of time associated with each of setting up a two-way channel between the user device 102 and the VPN server 120, exchanging protocol information regarding a protocol to be utilized to securely communicate data during the established VPN connection, setting up the protocol based at least in part on the protocol information, exchanging key information associated with keys to be utilized to encrypt and/or decrypt data during the established VPN connection, setting up a secure tunnel by the client application 112, setting up the secure tunnel by the VPN server 120, verifying the secure tunnel set up by the client application 112, etc. To determine the respective durations of time associated with performing each of the plurality of processes, the VSP control infrastructure 104 may utilize the device information and/or server information associated with the VPN server 120. In some aspects, as discussed below, the VSP control infrastructure 104 may account for one or more factors while determining each of the respective durations of time.

In an example, to determine a duration of time associated with exchanging protocol information regarding a protocol to be utilized during the established VPN connection, the VSP control infrastructure 104 may account for a complexity associated with utilizing the VPN protocol indicated in the device information. For instance, when the device information indicates that OpenVPN protocol is to be utilized during the established VPN connection, the VSP control infrastructure 104 may determine that a first duration of time may be associated with exchanging protocol information regarding OpenVPN protocol. Similarly, when the device information indicates that IKEv2 protocol is to be utilized during the established VPN connection, the VSP control infrastructure 104 may determine that a second duration of time may be associated with exchanging protocol information regarding IKEv2 protocol, the first duration of time being longer than the second duration of time. Similarly, when the device information indicates that Wireguard protocol is to be utilized during the established VPN connection, the VSP control infrastructure 104 may determine that a third duration of time may be associated with exchanging protocol information regarding Wireguard protocol, the second duration of time being longer than the third duration of time.

In another example, to determine a duration of time associated with setting up the protocol to be utilized during the established VPN connection, the VSP control infrastructure 104 may account for the complexity associated with utilizing the VPN protocol indicated in the device information. For instance, when the device information indicates that OpenVPN protocol is to be utilized during the established VPN connection, the VSP control infrastructure 104 may determine that a first duration of time may be associated with setting up OpenVPN protocol. Similarly, when the device information indicates that IKEv2 protocol is to be utilized during the established VPN connection, the VSP control infrastructure 104 may determine that a second duration of time may be associated with setting up IKEv2 protocol, the first duration of time being longer than the second duration of time. Similarly, when the device information indicates that Wireguard protocol is to be utilized during the established VPN connection, the VSP control infrastructure 104 may determine that a third duration of time may be associated with setting up Wireguard protocol, the second duration of time being longer than the third duration of time.

In yet another example, to determine a duration of time associated with setting up a two-way channel between the user device 102 and the VPN server 120, the VSP control infrastructure 104 may account for a distance between the user device 102 and the VPN server 120 and/or a distance between the VPN server 120 and an international Internet exchange hub (IIEH). In some aspects, the VSP control infrastructure 104 may determine the distance between the user device 102 and the VPN server 120 based at least in part on the determined geolocation of the user device 102 and of the VPN server 120. When the VSP control infrastructure 104 determines that the distance between the user device 102 and the VPN server 120 satisfies a threshold distance (e.g., the distance is equal to or greater than the threshold distance), the VSP control infrastructure 104 may determine that a first duration of time is associated with setting up the two-way channel. Similarly, when the VSP control infrastructure 104 determines that the distance between the user device 102 and the VPN server 120 fails to satisfy the threshold distance (e.g., the distance is less than the threshold distance), the VSP control infrastructure 104 may determine that a second duration of time is associated with setting up the two-way channel, the first duration of time being longer than the second duration of time. Similarly, when the VSP control infrastructure 104 determines that the distance between the VPN server 120 and the IIEH satisfies a threshold distance (e.g., the distance is equal to or greater than the threshold distance), the VSP control infrastructure 104 may determine that a first duration of time is associated with setting up the two-way channel. When the VSP control infrastructure 104 determines that the distance between the VPN server 120 and the IIEH fails to satisfy the threshold distance (e.g., the distance is less than the threshold distance), the VSP control infrastructure 104 may determine that a second duration of time is associated with setting up the two-way channel, the first duration of time being longer than the second duration of time.

In yet another example, to determine respective durations of time associated with performing each of a plurality of processes, the VSP control infrastructure 104 may account for an amount of available bandwidth and/or throughput associated with the VPN server 120, an amount of processing power associated with the VPN server 120, and/or an amount of user devices (associated with a plurality of users/accounts) being serviced by the VPN server 120. When the VSP control infrastructure 104 determines that the amount of available bandwidth and/or throughput satisfies a threshold bandwidth and/or throughput (e.g., the available bandwidth and/or throughput is equal to or greater than the threshold bandwidth and/or the threshold throughput), the VSP control infrastructure 104 may determine that first respective durations of time are associated with performing each of a plurality of processes. Similarly, when the VSP control infrastructure 104 determines that the amount of available bandwidth and/or throughput fails to satisfy the threshold bandwidth and/or throughput (e.g., the available bandwidth and/or throughput is less than the threshold bandwidth and/or the threshold throughput), the VSP control infrastructure 104 may determine that second respective durations of time are associated with performing each of a plurality of processes, the first respective durations of time being shorter than the second respective durations of time.

When the VSP control infrastructure 104 determines that the amount of processing power satisfies a threshold processing power (e.g., the processing power is equal to or greater than the threshold processing power), the VSP control infrastructure 104 may determine that first respective durations of time are associated with performing each of a plurality of processes. Similarly, when the VSP control infrastructure 104 determines that the amount of processing power fails to satisfy the threshold processing power (e.g., the available processing power is less than the threshold processing power), the VSP control infrastructure 104 may determine that second respective durations of time are associated with performing each of a plurality of processes, the first respective durations of time being shorter than the second respective durations of time.

When the VSP control infrastructure 104 determines that the amount of user devices being serviced by the VPN server 120 satisfies a threshold amount of user devices (e.g., the amount of user devices being serviced is equal to or greater than the threshold amount of user devices), the VSP control infrastructure 104 may determine that first respective durations of time are associated with performing each of the plurality of processes. Similarly, when the VSP control infrastructure 104 determines that the amount of amount of user devices being serviced fails to satisfy the threshold amount of user devices (e.g., the amount of user devices being serviced is less than the threshold amount of user devices), the VSP control infrastructure 104 may determine that second respective durations of time are associated with performing each of the plurality of processes, the first respective durations of time being longer than the second respective durations of time.

In yet another example, to determine the respective durations of time associated with performing each of the plurality of processes, the VSP control infrastructure 104 may account for a type of network connection associated with the user device 102 and/or an amount of processing power associated with the user device 102. When the VSP control infrastructure 104 determines that the user device 102 may utilize a mobile data connection, the VSP control infrastructure 104 may determine that first respective durations of time are associated with performing each of the plurality of processes. Similarly, when the VSP control infrastructure 104 determines that the user device 102 may utilize a Wi-Fi network connection or an ethernet network connection, the VSP control infrastructure 104 may determine that second respective durations of time are associated with performing each of the plurality of processes, the first respective durations of time being longer than the second respective durations of time. When the VSP control infrastructure 104 determines that the amount of processing power associated with the user device 102 satisfies a threshold processing power (e.g., the processing power is equal to or greater than the threshold processing power), the VSP control infrastructure 104 may determine that first respective durations of time are associated with performing each of the plurality of processes. Similarly, when the VSP control infrastructure 104 determines that the amount of processing power fails to satisfy the threshold processing power (e.g., the available processing power is less than the threshold processing power), the VSP control infrastructure 104 may determine that second respective durations of time are associated with performing each of the plurality of processes, the first respective durations of time being shorter than the second respective durations of time.

In some aspects, the processing power associated with the user device 102 and/or the VPN server 120 may be associated with, for example, a type of included storage unit (e.g., SSD, disk drive), an amount of RAM, an amount of cores included in an included processor (e.g., 4-core processor, 2-core processor, etc.), a clock speed associated with the included processor, a throughput associated with included processor and/or an included network card, a speed associated with an included bus to receive/transmit data, and the like. In some aspects, such information may be included in the device information and/or the server information.

In yet another example, to determine the respective durations of time associated with performing each of the plurality of processes, the VSP control infrastructure 104 may account for an operating system associated with the user device 102. In some aspects, the VSP control infrastructure 104 may determine that a first implementation of a given VPN protocol by a given operating system may be different from a second implementation of the given protocol by another operating system. For instance, the VSP control infrastructure 104 may determine that IKEv2 protocol may be native to an iOS operating system. As a result, when the VSP control infrastructure 104 determines that the user device 102 may utilize the iOS operating system and that IKEv2 protocol is to be implemented, the VSP control infrastructure 104 may determine that first respective durations of time are associated with performing each of the plurality of processes. Similarly, when the VSP control infrastructure 104 determines that the user device 102 may utilize a Windows operating system and that IKEv2 protocol is to be implemented, the VSP control infrastructure 104 may determine that a second duration of time is associated with performing each of the plurality of processes, the first respective durations of time being shorter than the second respective durations of time.

In yet another example, to determine the respective durations of time associated with performing each of the plurality of processes, the VSP control infrastructure 104 may account for an Internet service provider (ISP) associated with the user device 102. In some aspects, the VSP control infrastructure 104 may determine an identity of the ISP based at least in part on the IP address associated with the user device 102 and/or the geolocation of the user device 102. Based at least in part on the identity of the ISP, the VSP control infrastructure 104 may determine that the ISP is a high-tier ISP (e.g., tier-1 ISP) capable of providing network connectivity with high efficiency, low latency, and/or high bandwidth. Alternatively, the VSP control infrastructure 104 may determine that the ISP is a low-tier ISP (e.g., tier-2 ISP, tier-3 ISP, etc.). When the VSP control infrastructure 104 determines that the ISP is a high-tier ISP, the VSP control infrastructure 104 may determine that first respective durations of time are associated with performing each of the plurality of processes. Similarly, when the VSP control infrastructure 104 determines that the ISP associated with the user device 102 is a low-tier ISP, the VSP control infrastructure 104 may determine that second respective durations of time are associated with performing each of the plurality of processes, the first respective durations of time being shorter than the second respective durations of time.

In yet another example, to determine the respective durations of time associated with performing each of the plurality of processes, the VSP control infrastructure 104 may account for a time of day associated with configuring the VPN connection. For instance, the VSP control infrastructure 104 may determine that first respective durations of time are associated with performing each of the plurality of processes at a given time of day (e.g., daytime) and that second respective durations of time are associated with performing each of the plurality of processes at another time of day (e.g., nighttime), the first respective durations of time being longer than the second respective durations of time.

In some aspects, the VSP control infrastructure 104 may assign weights to one or more of the above parameters included in the device information and/or server information. For instance, the indicated VPN protocol may be assigned a weight such that the VPN protocol is considered to have high importance while determining the respective durations of time associated with performing each of the plurality of processes. The server information may be assigned a weight such that the server information is considered to have medium importance while determining the respective durations of time. Parameters such as geolocation of the user device 102 and/or the operating system utilized by the user device 102 may be assigned a weight such that the geolocation of the user device 102 and/or the operating system utilized by the user device 102 are considered to have low importance while determining the respective durations of time. The time of day may be assigned a weight such that the time of day is considered to have lower importance while determining the respective durations of time.

In some aspects, the VSP control infrastructure 104 may measure and/or record the respective durations of time associated with performing each of the plurality of processes related to configuring the VPN connection for the user device 102, and may utilize at least a part of the measured respective durations of time to determine respective durations of time associated with performing each of the plurality of processes related to configuring another (e.g., a next) VPN connection. In this way, the VSP control infrastructure 104 may form a feedback loop and allow at least a part of the measured and/or recorded respective durations of time (e.g., output) associated with configuring the VPN connection for the user device 102 to be utilized as input for determining the respective durations of time associated with configuring the VPN connection for another user device.

In some aspects, the VSP control infrastructure 104 may utilize a machine learning algorithm (ML algorithm) to determine the respective durations of time associated with performing each of the plurality of processes. Machine learning can be broadly described as computational methods using aggregated data to improve performance or to make more-accurate predictions. The aggregated data may refer to the past information available to the machine learning algorithm, which typically takes the form of electronic data collected and made available for analysis. The data associated with previous determinations of the respective times of duration by the VSP control infrastructure may be stored in a database (e.g., database 108 and/or database 116) and may be made available to a processor (e.g., processing unit 110 and/or processor 720) responsible for running the ML algorithm. A heuristic algorithm can be trained using the available data to predict future results. Computational or machine learning models may be used here for heuristic prediction (or for a part thereof).

The ML algorithm may include various mathematical and statistical models used for heuristic prediction and optimization. Such models may provide the respective durations of time within some confidence range. The ML algorithm may include additional features such as, for example, mathematical models used in optimization (for example, relaxation and approximation methods). The ML algorithm may comprise computational models such as neural networks, classification or regression trees, support vector machines, logistic regressors, Gaussian process models, or other computational models. Such computational models may essentially decide suitable coefficients, loads, groupings, associations, boundaries, hyperparameters, or other model traits that are utilized by the general heuristic prediction to make forecasts, by feeding as inputs into the heuristic prediction the aggregated data.

Some computational models and/or ML algorithms may be supervised, meaning that they may be trained for each case on defined training examples with a known output. Other computational models and/or ML algorithms may use unsupervised learning, meaning that they may be trained by unlabeled examples that have no defined outputs for each example. For example, if the ML algorithm is associated with an artificial neural network model (supervised or unsupervised), various coefficients that are used by the neural network may have to be learned. The artificial neural network may learn these coefficients using the input training data and by comparing the output result to known actual results.

In some aspects, an accuracy of the predictions may depend upon a computational complexity of the ML algorithm (e.g., how many independent variables/neurons/neuron-layers/etc. are considered) and/or the breadth of the aggregated data used to train the heuristic prediction. Moreover, because the aggregated data is periodically updated, the aggregated is not static and may receive new data or updates to previously received data. Thus, the ML algorithm may be configured to periodically re-train as the aggregated data is updated.

In some aspects, when the ML algorithm is an instance of supervised learning, the ML algorithm may use a comparison of predicted loading times and real recorded loading times as a feedback mechanism where a misjudgment is calculated by the difference. For example, if the predicted and shown loading time is 1.2 seconds and the reported real loading time is 1.4 seconds, then the penalty feedback score is 0.2. The ML algorithm may account for the penalty score and update the learned parameters based at least in part on a weight of the penalty score.

As shown by reference numeral 240, the VSP control infrastructure 104 may configure a progress indicator to indicate a remaining time associated with performing the plurality of processes related to configuring the VPN connection for the user device 102. For instance, the VSP control infrastructure 104 may configure the progress indicator to indicate a total duration of time associated with performing the plurality of processes, the total duration of time being substantially equal to a sum of the determined respective durations of time associated with performing each of the plurality of processes for configuring the VPN connection for the user device 102. In an example, the VSP control infrastructure 104 may configure the progress indicator to indicate the total duration of time that is substantially equal to a sum of the respective durations of time associated with each of setting up the two-way channel between the user device 102 and the VPN server 120, exchanging protocol information regarding the protocol to be utilized during the established VPN connection between the user device 102 and the VPN server 120, setting up the protocol based at least in part on the protocol information exchange between the user device 102 and the VPN server 120, exchanging key information associated with keys to be utilized to encrypt and/or decrypt data during the established VPN connection between the user device 102 and the VPN server 120, setting up the secure tunnel by the client application 112 installed on the user device 102, setting up the secure tunnel by the VPN server 120, verifying, by the VPN server 120, the secure tunnel set up by the client application 112 installed on the user device 102, etc.

In this way, by determining the respective durations of time associated with performing each of the plurality of processes based at least in part on accounting for, among other things, the differences among each of the plurality of the processes and/or or variations associated with completing one or more of the plurality of processes, the VSP control infrastructure may configure and enable the progress indicator to adequately represent the remaining time.

Additionally, or alternatively, the VSP control infrastructure 104 may measure respective durations of time during a given interval of time. Further, the VSP control infrastructure 104 may determine respective average durations of time based on averaging the measured respective durations of time. For instance, to determine an average duration of time associated with setting up the two-way channel between the user device 102 and the VPN server 120, the VSP control infrastructure 104 may average (e.g., calculate respective average durations) measured durations of time for setting up the two-way channel between user devices and the VPN servers during the given interval of time (e.g., last 60 minutes, last 12 hours, last 24 hours, last seven days, last month, etc.); to determine an average duration of time associated with exchanging protocol information regarding the protocol to be utilized, the VSP control infrastructure 104 may average measured durations of time for exchanging protocol information regarding a protocol to be utilized during the given interval of time (e.g., last 60 minutes, last 12 hours, last 24 hours, last seven days, last month, etc.); and so on. The VSP control infrastructure 104 may store the measured respective durations of time and the calculated average durations of time in a database.

The VSP control infrastructure 104 may configure a progress indicator to indicate a remaining time associated with performing the plurality of processes related to configuring the VPN connection for the user device 102. For instance, the VSP control infrastructure 104 may configure the progress indicator to indicate a total duration of time associated with performing the plurality of processes, the total duration of time being substantially equal to a sum of the average respective durations of time. In an example, the VSP control infrastructure 104 may configure the progress indicator to indicate the total duration of time that is substantially equal to a sum of the average respective durations of time associated with each of setting up the two-way channel between user devices and VPN servers during the given interval of time, exchanging protocol information regarding the protocol to be utilized during established VPN connections between user devices and VPN servers during the given interval of time, setting up the protocol based at least in part on the protocol information exchange between user devices and VPN servers during the given interval of time, exchanging key information associated with keys to be utilized to encrypt and/or decrypt data during the established VPN connection between user devices and VPN servers during the given interval of time, setting up the secure tunnel by the client application 112 installed on user devices during the given interval of time, setting up the secure tunnel by the VPN servers during the given interval of time, verifying, by the VPN servers during the given interval of time, the secure tunnel set up by the client application 112 installed on user devices, etc.

With respect to exchanging the protocol information and/or setting up the protocol, the VSP control infrastructure 104 may utilize the measured durations of time associated with the VPN protocol indicated in the device information transmitted by the user device 102. In some aspects, the VSP control infrastructure may determine an optimal VPN protocol to be utilized between the user device 102 and the VPN server 120 during the established VPN connection. When it is determined that IKEv2 protocol is to be utilized, the VSP control infrastructure 104 may utilize the measured durations of time associated with exchanging IKEv2 protocol information and/or setting up IKEv2 protocol between user devices and VPN servers during the given interval of time. In another example, when it is determined that Wireguard protocol is to be utilized, the VSP control infrastructure 104 may utilize the measured duration of time associated with exchanging Wireguard protocol information and/or setting up Wireguard protocol between user devices and VPN servers during the given interval of time.

In this way, by determining the respective durations of time associated with performing each of the plurality of processes based at least in part on averaging measured durations of time, the VSP control infrastructure may configure and enable the progress indicator to adequately represent the remaining time.

As shown by reference numeral 250, the VSP control infrastructure 104 may transmit, to the client application 112 installed on the user device 102, information regarding displaying the configured progress indicator. By transmitting the information regarding displaying the configured progress indicator, the VSP control infrastructure 104 may cause the progress indicator to be displayed on a screen associated with the user device 102. The client application 112 may utilize a processor associated with the user device 102 to process the information regarding displaying the configured progress indicator and may utilize the graphical interface associated with the client application 112 to display the progress indicator. Further, the VSP control infrastructure 104 may monitor performance of each of the plurality of processes by the client application 112 and the VPN server 120, and may transmit, in real-time, progress information associated with the performance of each of the plurality of processes. Based at least in part on receiving the progress information, the client application 112 may utilize the processor associated with the user device 102 to display, in real-time, progress associated with performance of each of the plurality of processes by the client application 112 and the VPN server 120. In this way, the VSP control infrastructure may configure and enable the progress indicator to adequately represent the remaining time.

By utilizing the above systems and techniques associated with configuring a protocol in a VPN, the VSP control infrastructure may configure and enable the progress indicator to adequately represent the remaining time and avoid a situation in which the user device ends the configuration of the VPN connection prior to completion of the performance of the plurality of processes. As a result, retransmitting an initiation request and/or configuring a new VPN connection may be avoided. Consequently, user device resources (e.g., processing resources, memory resources, power consumption resources, battery life, or the like) and resources associated with the VPN (computational resources, network bandwidth, management resources, processing resources, memory resources, or the like) may be used to perform suitable tasks associated with the VPN. Further, one or more VPN services may be provided to the user device without delay.

As indicated above, FIG. 2 is provided as an example. Other examples may differ from what is described with regard to FIG. 2.

FIG. 3 is an illustration of examples associated with configuring and displaying a progress indicator in a VPN, according to various aspects of the present disclosure. In an example, the progress indicator may be in the form of a progress bar associated with time projected along an x-axis. An entire length of the progress bar may be associated with a total duration of time (e.g., Total time) associated with performing the plurality of processes for configuring a VPN connection. Further, the progress bar may be configured to employ shaded motion to show real-time progress associated with performing each of the plurality of processes related to configuring the VPN connection for the user device 102. In another example, the progress indicator may be in the form of a circle. An entire area of the circle may be associated with a total duration of time (e.g., Total time) associated with performing the plurality of processes for configuring a VPN connection. Further, the progress indicator may be configured to employ shaded motion to show real-time progress (e.g., 25%) associated with performing each of the plurality of processes related to configuring the VPN connection for the user device 102. In yet another example, the progress indicator may be in the form of a clock timer counting down from a total time (e.g., 1 minute). Further, the progress bar may be configured to show real-time progress (e.g., 20 seconds and 32 milli seconds remaining) associated with performing each of the plurality of processes related to configuring the VPN connection for the user device 102.

As indicated above, FIG. 3 is provided as an example. Other examples may differ from what is described with regard to FIG. 3.

FIG. 4 is an illustration of an example associated with configuring and displaying a progress indicator in a VPN, according to various aspects of the present disclosure. In an example, the progress indicator may include a depiction of a container (e.g., a cup, a mug, etc.) including an amount of substance. In some aspects, the substance may depict a liquid substance (e.g., water, beer, etc.). In some aspects, the substance may depict a solid substance (e.g., blocks, etc.). An entire amount associated with the substance may be associated with a total duration of time (e.g., total time) for performing the plurality of processes related to configuring the VPN connection for the user device 102. Further, the progress indicator may be configured to employ motion in the form of a reduction in the amount of the substance to show real-time progress associated with performing each of the plurality of processes. In this example, the progress indicator might be a visual indicator and imitate a known physical process from beginning to end.

As indicated above, FIG. 4 is provided as an example. Other examples may differ from what is described with regard to FIG. 4.

FIG. 5 is an illustration of an example process 500 associated with configuring and displaying a progress indicator in a VPN, according to various aspects of the present disclosure. In some aspects, the process 500 may be performed by a processor/controller (e.g., processing unit 110 and/or processor 720) associated with a VSP control infrastructure (e.g., VSP control infrastructure 104). As shown by reference numeral 510, process 500 includes receiving, from a user device, device information indicating parameters to be utilized by the user device during an established VPN connection. For instance, the VSP control infrastructure may utilize an associated communication interface (e.g., communication interface 770) along with the associated processor/controller to receive, from a user device, device information indicating parameters to be utilized by the user device during an established VPN connection, as discussed elsewhere herein.

As shown by reference numeral 520, process 500 includes determining, based at least in part on the device information, a VPN server for providing one or more VPN services to the user device during the established VPN connection. For instance, the VSP control infrastructure may utilize the associated processor/controller to determine, based at least in part on the device information, a VPN server for providing one or more VPN services to the user device during the established VPN connection, as discussed elsewhere herein.

As shown by reference numeral 530, process 500 includes determining, based at least in part on the device information and server information associated with the VPN server, respective durations of time associated with performing each of a plurality of processes related to configuring the VPN connection. For instance, the VSP control infrastructure may utilize the associated processor/controller to determine, based at least in part on the device information and server information associated with the VPN server, respective durations of time associated with performing each of a plurality of processes related to configuring the VPN connection, as discussed elsewhere herein.

As shown by reference numeral 540, process 500 includes configuring a progress indicator configured to indicate an amount of time remaining to configure the VPN connection. For instance, the VSP control infrastructure may utilize the associated processor/controller to configure a progress indicator configured to indicate an amount of time remaining to configure the VPN connection, as discussed elsewhere herein.

As shown by reference numeral 550, process 500 includes transmitting, to the user device, information associated with the progress indicator to enable display of the progress indicator on a screen associated with the user device. For instance, the VSP control infrastructure may utilize the communication interface and the associated processor/controller to transmit, to the user device, information associated with the progress indicator to enable display of the progress indicator on a screen associated with the user device, as discussed elsewhere herein.

Process 500 may include additional aspects, such as any single aspect or any combination of aspects described below and/or in connection with one or more other processes described elsewhere herein.

In a first aspect, in process 500, receiving the device information includes receiving the device information prior to the VPN connection being established.

In a second aspect, alone or in combination with the first aspect, in process 500, the parameters include an internet protocol (IP) address associated with the user device and a VPN protocol to be utilized during the established VPN connection.

In a third aspect, alone or in combination with the first through second aspects, in process 500, the parameters include an operating system utilized by the user device and a type of network connection to be used by the user device during the established VPN connection.

In a fourth aspect, alone or in combination with the first through third aspects, in process 500, determining the respective durations of time includes utilizing a machine learning algorithm to determine the respective durations of time.

In a fifth aspect, alone or in combination with the first through fourth aspects, in process 500, determining the respective durations of time includes utilizing a distance between a geolocation of the user device and a geolocation of the VPN server to determine the respective durations of time.

In a sixth aspect, alone or in combination with the first through fifth aspects, process 500 includes measuring the respective durations of time associated with performing each of a plurality of processes related to configuring the VPN connection; and utilizing the measured respective durations of time to determine respective durations of time associated with performing each of the plurality of processes related to configuring another VPN connection.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with configuring a protocol in a VPN, according to various aspects of the present disclosure. In some aspects, the process 600 may be enabled by a VSP control infrastructure (e.g., VSP control infrastructure 104) and may be performed by a memory (e.g., memory 730) and a processor (e.g., processing unit 110, processor 720, etc.) associated with the VSP control infrastructure. As shown by reference numeral 610, process 600 includes measuring, during a given interval of time, respective durations of time associated with performing a plurality of processes for configuring VPN connections. For instance, the VSP control infrastructure may utilize the associated memory and processor to measure, during a given interval of time, respective durations of time associated with performing a plurality of processes for configuring VPN connections, as discussed elsewhere herein.

As shown by reference numeral 620, process 600 includes calculating average respective durations of time based at least in part on the measured respective durations of time. For instance, the VSP control infrastructure may calculate average respective durations of time based at least in part on the measured respective durations of time, as discussed elsewhere herein.

As shown by reference numeral 630, process 600 includes configuring a progress indicator to indicate a total duration of time associated with configuring a VPN connection for a user device, the total duration of time being substantially equal to a sum of the average respective durations of time. For instance, the VSP control infrastructure may utilize the associated memory and processor to configure a progress indicator to indicate a total duration of time associated with configuring a VPN connection for a user device, the total duration of time being substantially equal to a sum of the average respective durations of time, as discussed elsewhere herein.

As shown by reference numeral 640, process 600 includes transmitting, to the user device, information associated with the progress indicator to enable display of the progress indicator on a screen associated with the user device. For instance, the VSP control infrastructure may utilize a communication interface (e.g., communication interface 770) to transmit, to the user device, information associated with the progress indicator to enable display of the progress indicator on a screen associated with the user device, as discussed elsewhere herein.

Process 600 may include additional aspects, such as any single aspect or any combination of aspects described below and/or in connection with one or more other processes described elsewhere herein.

In a first aspect, process 600 includes summing the average respective durations of time to determine the total duration of time.

In a second aspect, alone or in combination with the first aspect, process 600 includes determining a VPN protocol to be utilized during the VPN connection for the user device, wherein calculating the average respective durations of time includes calculating the average durations of time based at least in part on measured respective durations of time associated with the determined VPN protocol.

In a third aspect, alone or in combination with the first through second aspects, process 600 includes determining a VPN protocol to be utilized during the VPN connection for the user device based at least in part on receiving device information from the user device prior to establishment of the VPN connection.

In a fourth aspect, alone or in combination with the first through third aspects, process 600 includes configuring the progress indicator to represent a remaining time associated with completing performance of the plurality of processes.

In a fifth aspect, alone or in combination with the first through fourth aspects, in process 600, measuring the respective durations of time includes monitoring performance of the plurality of processes by a client application installed on the user device and a VPN server.

In a sixth aspect, alone or in combination with the first through fifth aspects, process 600 includes storing, in an associated database, the respective durations of time and the calculated average durations of time.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, or the like described elsewhere herein (e.g., FIG. 1 and/or FIG. 2) and may be used to perform the processes described with respect to FIGS. 5 and 6. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method in a virtual private network (VPN) service environment, the method comprising:
    receiving, from a device prior to a VPN connection being established, device information indicating parameters associated with the device;
    determining, based at least in part on the device information, a VPN server for providing one or more VPN services to the device;
    determining, based at least in part on the device information and server information associated with the VPN server, respective durations of time associated with performing each of a plurality of processes related to configuring the VPN connection;
    configuring a progress indicator to indicate an amount of remaining time associated with configuring the VPN connection; and
    transmitting, to the device, information associated with the progress indicator to enable display of the progress indicator on a screen associated with the device.

2. The method of claim 1, wherein the parameters include an internet protocol (IP) address associated with the device and a VPN protocol to be utilized during the established VPN connection.

3. The method of claim 1, wherein the parameters include an operating system utilized by the device and a type of network connection to be used by the device during the established VPN connection.

4. The method of claim 1, wherein determining the respective durations of time includes utilizing a machine learning algorithm to determine the respective durations of time.

5. The method of claim 1, wherein determining the respective durations of time includes utilizing a distance between a geolocation of the device and a geolocation of the VPN server to determine the respective durations of time.

6. The method of claim 1, further comprising:
    measuring the respective durations of time associated with performing each of a plurality of processes related to configuring the VPN connection; and
    utilizing the measured respective durations of time to determine respective durations of time associated with performing each of the plurality of processes related to configuring another VPN connection.

7. A device associated with a virtual private network (VPN) service environment, the device comprising:
    a memory; and
    a processor communicatively coupled to the memory, the memory and the processor being configured to:
        receive, from a user device prior to a VPN connection being established, device information indicating parameters associated with the user device;
        determine, based at least in part on the device information, a VPN server for providing one or more VPN services to the user device during the established VPN connection;
        determine, based at least in part on the device information and server information associated with the VPN server, respective durations of time associated with performing each of a plurality of processes related to configuring the VPN connection;
        configure a progress indicator to indicate an amount of remaining time associated with configuring the VPN connection; and
        transmit, to the user device, information associated with the progress indicator to enable display of the progress indicator on a screen associated with the user device.

8. The device of claim 7, wherein the parameters include an internet protocol (IP) address associated with the user device and a VPN protocol to be utilized during the established VPN connection.

9. The device of claim 7, wherein the parameters include an operating system utilized by the user device and a type of network connection to be used by the user device during the established VPN connection.

10. The device of claim 7, wherein, to determine the respective durations of time, the memory and the processor are configured to utilize a machine learning algorithm to determine the respective durations of time.

11. The device of claim 7, wherein, to determine the respective durations of time, the memory and the processor are configured to utilize a distance between a geolocation of the user device and a geolocation of the VPN server to determine the respective durations of time.

12. The device of claim 7, wherein the memory and the processor are configured to:
    measure the respective durations of time associated with performing each of a plurality of processes related to configuring the VPN connection; and
    utilize the measured respective durations of time to determine respective durations of time associated with performing each of the plurality of processes related to configuring another VPN connection.

13. A non-transitory computer-readable medium configured to store instructions, which when executed by a processor, configure the processor to:
- receive, from a device prior to a VPN connection being established, device information indicating parameters associated with the device;
- determine, based at least in part on the device information, a VPN server for providing one or more VPN services to the device during the established VPN connection;
- determine, based at least in part on the device information and server information associated with the VPN server, respective durations of time associated with performing each of a plurality of processes related to configuring the VPN connection;
- configure a progress indicator to indicate an amount of remaining time associated with configuring the VPN connection; and
- transmit, to the device, information associated with the progress indicator to enable display of the progress indicator on a screen associated with the device.

14. The non-transitory computer-readable medium of claim 13, wherein the parameters include an internet protocol (IP) address associated with the device and a VPN protocol to be utilized during the established VPN connection.

15. The non-transitory computer-readable medium of claim 13, wherein the parameters include an operating system utilized by the device and a type of network connection to be used by the device during the established VPN connection.

16. The non-transitory computer-readable medium of claim 13, wherein the processor is configured to utilize a machine learning algorithm to determine the respective durations of time.

17. The non-transitory computer-readable medium of claim 13, wherein the processor is configured to utilize a distance between a geolocation of the device and a geolocation of the VPN server to determine the respective durations of time.

18. The non-transitory computer-readable medium of claim 13, processor is wherein the memory and the processor are configured to:
- measure the respective durations of time associated with performing each of a plurality of processes related to configuring the VPN connection; and
- utilize the measured respective durations of time to determine respective durations of time associated with performing each of the plurality of processes related to configuring another VPN connection.

* * * * *